TERNARY LOGIC SYSTEM ADAPTED FOR ANTENNA TUNING

Filed Sept. 27, 1966

INVENTOR.
J. LOUIS NIELSEN

BY Samuel R. Genca ATTY.

United States Patent Office 3,496,493

Patented Feb. 17, 1970

3,496,493

TERNARY LOGIC SYSTEM ADAPTED FOR ANTENNA TUNING

Jorgen Louis Nielsen, Penfield, N.Y., assignor to General Dynamics Corporation, a corporation of Delaware Filed Sept. 27, 1966, Ser. No. 582,273
Int. Cl. H04b 3/04
U.S. Cl. 333—17 8 Claims

ABSTRACT OF THE DISCLOSURE

An antenna tuner is described which is equipped with ternary logic for controlling the adjustment of a variable inductor in the tuning network. The ternary logic includes a pair of differential amplifiers connected to the impedance sensor and phase discriminator of the tuner and high and low limit threshold gates, each of which is coupled to both of the differential amplifiers so as to provide three outputs, first when both differential amplifier inputs are above a high threshold, second when either of the differential amplifier inputs is below a low threshold and third, when either of the differential amplifier inputs is in the linear region of the differential amplifier operating characteristics which exists between the high and low thresholds.

The present invention relates to an impedance matching system and more particularly to a system for controlling the operation of an antenna tuner.

The invention is particularly adapted for use in an automatic impedance matching system of the type used in mobile service for matching the impedance of an antenna to a transmitter during transmission of RF power. However, the invention provides improved logic circuitry adapted for motor control and other purposes. It is well known that the impedance of an antenna may change rapidly and sometimes unpredictably when used in a radio communication system of an automobile, airplane, boat, or the like. In the past, many attempts have been made to provide coupling circuits of pi- or T-networks having reactive elements in series and parallel branches thereof. For example, the impedance of the antenna may be automatically modified to within a matchable impedance area by varying the reactance of one of the reactive elements in one of the series branches and then effecting an impedance match between the antenna and transmitter by tuning the other reactive elements in the other branches. In such automatic systems, a reversible tuning motor varies the reactance of the one reactive element in the series branch in response to control signals from an impedance magnitude sensor and a phase discriminator in the series branch. The impedance sensor derives an error output signal if the antenna impedance varies from a given reference impedance and the phase discriminator provides an error voltage signal if the current and voltage are out of phase with each other in that branch.

One of the problems associated with such systems is that the balance or null condition of the impedance magnitude sensor or the phase discriminator in practice is difficult to maintain, and thus, the tuning motor may be continuously energized for small input signals and continuously search. In other words, the tuning motor may continuously hunt during the duration of the small input signals from an impedance magnitude sensor and/or phase discriminator.

Accordingly, it is an object of the present invention to provide an improved impedance matching system.

It is another object of the present invention to provide an improved antenna tuning system.

It is still another object of the present invention to provide an improved system for controlling a reversible motor.

It is yet another object of the present invention to provide an improved system wherein three level decision on the basis of outputs from two electrical devices can be made.

It is still another object of the present invention to provide an improved ternary logic circuit for eliminating hunting of a motor in response to small electrical input signals.

It is yet another object of the present invention to provide an improved ternary logic circuit which responds to input signals of a given level to energize a motor in a clockwise or counter clockwise direction or to de-energize the motor in response to a null condition or to small variations in electrical signals.

It is still another object of the present invention to provide an improved ternary logic circuit for an automatic impedance matching system.

Briefly described, a system embodying the invention includes a circuit which utilizes the linear operating characteristics of a differential amplifier coupled to a threshold gate through a biased OR gate for deriving three distinct operating voltage levels or regions. The differential amplifier operates in a linear mode for small input signals and saturates in one of two voltage level states in response to input signals above or below given voltage levels. The logic circuit includes a first differential amplifier, an OR gate and a threshold gate responsive to input signals at or below the given high voltage level for energizing a solenoid of a high limit relay which controls power to a tuning motor. The logic circuit also includes a second differential amplifier, another OR gate and a threshold gate responsive to input signals at or below the given low voltage level for energizing a solenoid of a low limit relay having contacts connected in cooperative relationship with the high limit relay for energizing the tuning motor in an opposite direction or for de-energizing the tuning motor. Small input signals which fall between the upper and low voltage levels do not effect the operation of the high limit and low limit relays and thus, a region is established in which the tuning motor is de-energized and does not hunt or search.

The invention itself both as to its organization and method of operation as well as additional objects and advantages thereof will become readily apparent from a reading of the following description in connection with the accompanying drawing in which.

Figures 1, 2, 3:
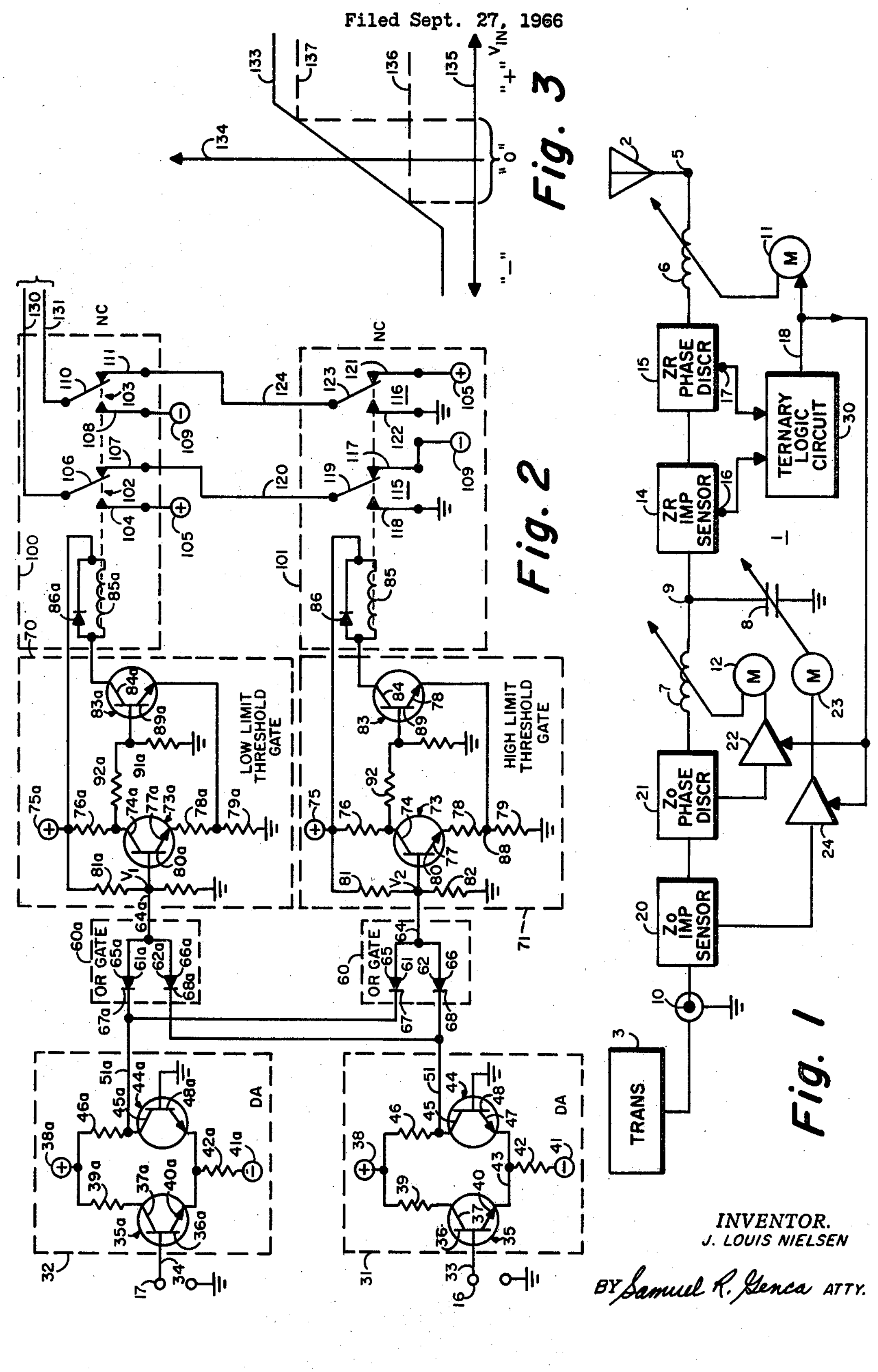
FIG. 1 is a block diagram of an automatic impedance matching system in accordance with the invention having a ternary logic circuit.
FIG. 2 is a schematic diagram of a ternary logic circuit in accordance with the invention.
FIG. 3 is a graph showing the operating characteristics of a differential amplifier employed in the ternary logic circuit of FIG. 2.

Referring to FIG. 1, an antenna 2, such as a whip antenna, half-wave doublet or the like is shown connected to a transmitter 3 through an impedance matching system 1. The impedance matching system 1 comprises a two port network including series and parallel branches connected in a T-section network configuration. The T-section network includes first and second series connected tunable inductors 6 and 7 respectively defining the series branches of the network. A tunable capacitor 8 is shown connected between ground and a junction or node 9 between the first and second inductors 6, 7 to define a parallel branch of the network. The first and second inductors 6 and 7 are connected between nodes 5 and 10.

The first and second inductors 6 and 7 may be, for example, coils having turns which may be shorted out by a mechanism including a roller or wiper (not shown) to short the turns to vary the inductive reactance thereof. The mechanisms for varying the inductance of the first and second inductors 6 and 7 are coupled to a reversible tuning DC motor 11 and a reversible servo motor 12 respectively, both of which may be energized in either a clockwise or counter clockwise direction to increase or decrease the inductance of the first and second inductors 6 and 7 respectively.

The impedance matching system also includes a reference impedance sensor 14 and a phase discriminator 15 connected between the node 9 and the first tunable inductor 6 for sensing the RF voltage at node 9 with respect to ground and the RF current flowing through the first inductor 6 to derive impedance and phase information, as will be more fully described hereinafter. The first inductor 6 may be tuned to modify the inductance of the antenna, as seen looking into the node 5. The impedance sensor 14 and the phase discriminator 15 each produce an error voltage output at terminals 16 and 17 respectively when the impedance of the antenna or the load impedance as modified by the inductor 6 has an impedance magnitude which varies from a reference impedance and the phase of the RF voltage at node 9 with respect to ground is out of phase with the RF current flowing in the inductor 6 respectively.

The impedance sensor 14 and the phase discriminator 15 are well known to those skilled in the art and form no part of this invention.

A ternary logic circuit 30 is shown connected to the impedance sensor 14 at terminal 16 and to the phase discriminator 15 at terminal 17. The ternary logic circuit 30 has an output at lead 18 which is applied to the motor 11. The ternary logic circuit 30 is shown in FIG. 2 and will be described more fully in conjunction with FIG. 2.

Another set of sensing means including an impedance magnitude sensor 20 and an impedance phase discriminator 21 similar to the reference impedance sensor 14 and the phase discriminator 15 are shown connected in series with the tunable inductor 7 between nodes 9 and 10. The output of the phase discriminator 21 is applied to the servo motor 12 through an amplifier 22. An output from the phase discriminator 21 is amplified by the amplifier 22 and drives the servo motor 12 in a clockwise or counter clockwise direction, depending on the polarity of the voltage applied, to tune the inductor 7. The output of the impedance sensor 20 is applied to a servo motor 23 through an amplifier 24. The motor 23 is coupled to the tunable capacitor 8 and varies the capacitance of the capacitor 8 in response to an amplified signal from the impedance sensor 20. The amplifiers 22 and 24 are enabled only when the ternary logic circuit 30 produces a null on output lead 18. Whenever a potential or voltage exists on lead 18, amplifiers 22 and 24 are inhibited from amplifying an output signal from the phase discriminator 21 and the impedance sensor 20.

In the operation of the impedance matching system 1, the transmitter 3 supplies RF power to the antenna 2 through the impedance matching system 1. Initially, the impedance matching system is adjusted to effectively provide a low resistance conducting path between the transmitter 3 and the antenna 2. This is accomplished in the first instance by adjusting the capacitor 8 to achieve an open AC circuit between node 9 and ground. The first and second inductors 6 and 7 also are adjusted to provide this low resistance path by shorting out all the active turns in each coil (not shown) of the inductors 6 and 7.

When RF power is being transmitted to the antenna 2, the reference impedance sensor 14 and the reference phase discriminator 15 each sense the RF voltage with respect to ground in the series branch containing the first inductor 6 and the current flowing in that branch. If the magnitude of the antenna impedance is equal to the magnitude of the reference impedance, a null (0) or balanced output will exist at output terminal 16. However, if the magnitude of the antenna impedance is higher or lower than the magnitude of the reference impedance, a positive or negative potential will exist on terminal 16. The phase discriminator 15 has a null or balanced output on terminal 17 when the voltage in the series branch containing the first inductor 6 with respect to ground is in phase with the current flowing in that branch. However, if the current is out of phase with the voltage, the output of the phase discriminator at terminal 17 will either be more positive or more negative with respect to ground.

The error output voltages of the impedance sensor 14 and the phase discriminator 15 are applied to the ternary logic circuit which combines these error voltages in a predetermined manner, as will be more fully described in conjunction with FIG. 2, to drive the motor 11 in a clockwise or counter clockwise direction to suitably tune the inductor 6, and thus modify the antenna impedance to a desired impedance within a matchable area. After the antenna impedance has been modified to within a matchable area, an inverted L-section defined by the inductor 7 and the capacitor 8 further modify the antenna impedance until a suitable match between the impedance of the antenna and the impedance of the transmitter 3 is effected.

Referring now to FIG. 2, the ternary logic circuit 30 comprises first and second differential amplifiers 31 and 32 having input leads 33 and 34 connected to terminals 16 and 17 respectively. The first differential amplifier 31 includes a transistor 35 of the NPN type having a base 36 connected to the lead 33, a collector 37 connected to a source of positive potential 38 through a resistor 39. The emitter 40 of the transistor 35 is connected to a source of negative potential 41 through a resistor 42 by way of a lead 43. A second NPN transistor 44 includes a collector 45 connected to the source of positive potential 38 through a resistor 46. The emitter 47 of the transistor 44 is connected to the source of negative potential 41 through the resistor 42. The transistor 44 includes a base 48 connected to ground. The output of the differential amplifier 31 is taken off at lead 51 which is connected at a junction between the collector 45 and resistor 46.

The differential amplifiers 31 and 32 are shown by way of example, and not by limitation. One input is shown as being as ground, while the other input is shown at lead 33.

Differential amplifier 32 is similar to the differential amplifier 31 so that elements in the differential amplifier 32 which correspond to the differential amplifier 31 are similarly numbered, except that the letter *a* is added after each of the identifying numerals. Differential amplifier 32 includes a transistor **35*a* having a base 36*a* connected to the lead 34. The transistor 35 includes a collector 37*a* connected to the source of positive potential 38*a* through a resistor 39*a*. The transistor 35*a* includes an emitter 40*a* connected to a source of negative potential 41*a* through a resistor 42*a*. The differential amplifier 32 also includes a second transistor 44 having a collector 45 connected to the source of positive potential 38*a* through resistor 46*a* and an emitter 47 connected to the source of negative potential 41*a* through resistor 42*a*. The transistor 44*a* includes a base electrode 48*a* connected to ground. The differential amplifier 32 has an output lead 51*a* connected to a junction between the collector 45*a* and a resistor 46*a***.

The ternary logic circuit 30 also includes two diode gates 60 and **60*a*. OR gate 60 includes diodes 61 and 62 connected in a back-to-back relationship with an output lead 64 connected in common to the anodes 65 and 66 of diodes 61 and 62. Diodes 61 and 62 include electrodes 67 and 68 respectively connected to the output leads 51 and 51*a***.

OR gate **60*a* is similar to OR gate 60 and includes a diode 61*a* having an anode 65*a* and an electrode 67*a* connected to the output of the differential amplifier 32 by way of lead 51*a*. OR gate 60*a* also includes a second diode 62*a* having an anode 66*a* and an electrode 68*a*** connected to the output of the differential amplifier 31 by way of lead 51. Electrode 67*a* of diode 61*a* is also connected to the electrode 67 of diode 61. The diodes 61*a* and 62*a* are connected in a back-to-back relationship with the anodes 65*a* and 66*a* connected to an output lead 64*a*.

The ternary logic circuit further includes a bistable amplifier or low limit threshold gate 70 and another bistable amplifier or high limit threshold gate 71, both of which may be of the Schmidt trigger type. The high limit threshold gate 71 is connected to OR gate 60 at lead 64 and is biased at lead 64 by a potential $V_2$. The high limit threshold gate 71 includes a transistor 73 having a collector 74 connected to a source of positive potential 75 through a resistor 76 and an emitter 77 connected to ground through resistors 78 and 79. The transistor 73 also includes a base 80 connected between a pair of resistors 81 and 82 which serve as a voltage divider between the source of positive potential 75 and ground and provide the bias voltage $V_2$. Transistor 73 is normally biased in the forward direction. The high limit threshold gate 71 also includes another transistor 83 having a collector 84 connected to the source of positive potential 75 through a solenoid 85 and a parallel connected diode 86 to the source of positive potential 75. The transistor 83 includes an emitter 87 connected to ground through resistor 79 through a junction 88 between resistors 78 and 79. The base 89 of the transistor 83 is connected between a voltage divider network comprising resistors 91 and 92 which are connected between ground and an output terminal between resistor 76 and the collector 74 of the transistor 73. The transistor 83 is normally back biased when transistor 73 is forward biased. Thus, current flows through the solenoid 85 only when transistor 83 is forward biased.

The low limit threshold gate 70 is similar to the low limit threshold gate 71, except that a different bias condition exists on lead 64*a*. Lead 64*a* has a bias voltage $V_1$ which is less than the voltage $V_2$ (viz $V_1<V_2$). The low limit threshold gate 70 includes a transistor 73*a* having a collector 74*a* connected to a source of positive potential 75*a* through resistor 76*a* and an emitter 77*a* connected to ground through a pair of resistors 78*a* and 79*a*. The transistor 73*a* includes a base 80*a* connected to lead 64*a* at a junction between a voltage divider including resistors 81*a* and 82*a* which are connected between the source of positive potential 75*a* and ground. Transistor 73*a* is normally biased in the forward direction by the bias $V_1$. The low limit threshold gate 70 also includes a transistor 83*a* having a collector 84*a* connected to the source of positive potential 75*a* through a solenoid 85*a* and a parallel connected diode 86*a*. Transistor 83*a* also includes an emitter 87*a* connected to ground through the resistor 79*a*. The base 89*a* of the emitter 83*a* is connected to a voltage divider including resistors 91*a* and 92*a*. Transistor 83 is normally reverse biased when transistor 73*a* is forward biased.

The ternary logic circuit 30 also includes a low limit relay 100 associated with the low threshold gate 70, and a high limit relay 101 associated with the high limit threshold gate 71. The low limit relay 100 includes the solenoid 85*a* and two sets of change over contacts 102 and 103. One set of change over contacts 102 includes a "make" or normally open (NO) contact 104 connected to a source of positive potential 105, a "break" or normally closed (NC) contact 107 connected to relay 101, and a moveable contact 106 moveable between contacts 104 and 107. The other set of change over contacts 103 include a "make" or normally open (NO) contacts 108 connected to a negative source of potential 109, a "break" or normally closed (NC) contact 111 connected to relay 101, and a moveable contact 110 moveable between contacts 108 and 111.

Relay 101 is like relay 100 and includes two sets of change over contacts 115 or 116. Change over contacts 115 include a "make" or normally closed contacts 117 connected to the source of negative potential 109 which is similarly numbered as the source of negative potential which supplied the normally open contacts 108. Change over contacts 115 also includes a contact 118 connected to ground and a moveable contact 119 connected to contact 107 by a lead 120 so that the negative potential 109 is supplied to moveable contact 106 when both contacts 102 and 115 are in the normally closed position. Contacts 116 includes a contact 121 connected to the source of positive potential 105 and another contact 122. A moveable contact 123 coacts with contacts 121 and 122. The moveable contact 123 is connected to contact 111 through a lead 124 so that moveable contact 110 is connected to the source of positive potential 105 when contacts 103 and 116 are in a normally closed position. Output leads 130 and 131 are connected to moveable contacts 106 and 110 for supplying energizing current to the DC motor 11. Output leads 130 and 131 are represented in FIG. 1 by output lead 18. It may now be seen that leads 130 and 131 may have a negative to positive or positive to negative energizing current for energizing the motor 11 in a clockwise or counter clockwise direction. The DC motor 11 is de-energized and dynamically braked when ground is applied to leads 130 and 131 through normally closed contacts 102 and 103 and moveable contacts 119 and 123 connected to contacts 116 and 118.

FIG. 3 shows the operating characteristics of the differential amplifiers 31 and 32. The differential amplifiers 31 and 32 operate in a linear mode for very small input signals and otherwise saturate in one of two extreme states, as shown by the curve 133. The vertical axis 134 represents the voltage output of the differential amplifier while the horizontal axis 135 represents the voltage applied to the differential amplifiers 31 and 32 at input terminals 16 and 17 with rspect to ground. Lines 136 and 137 illustrates the bias condition of the low and high limit threshold gates 70 and 71. Since the threshold gates 70 and 71 operate on the linear portion of the curve, three well defined voltage zones are established along the horizontal axis, or in other words, the input signals to the differential amplifiers 31 and 32 may fall within these three voltage zones. Thus, for very small input signals falling along the linear portion of the curve 133, the differential amplifiers 31 and 32 effectively see a "zero" voltage input.

In the operation of the ternary logic circuit 30, input signals are applied to terminals 16 and 17 from the impedance sensor 14 and the phase discriminator 15 which may be representative of two sensing devices which produce output signals in response to some given parameters, such as for example, impedance of a load or phase relationship of current and voltage. The ternary logic circuit 30 of FIG. 2 is shown as being stimulated with a positive potential on terminals 16 and 17 so that both the transistors 44 and 44*a* of the differential amplifiers 31 and 32 respectively, are back biased and transistors 35 and 35*a* are forward biased to produce a high positive potential on leads 51 and 51*a*. Thus, OR gates 60 and 60*a* are both back biased and non-conducting. The low limit threshold gate 70 and the high limit threshold gate 71 are therefore in the "off" state, i.e., solenoids 85*a* and 85 are de-energized. Thus, relays 100 and 101 are normally de-energized and contacts 102 and 103 of relay 100 are held in a normally closed position and contacts 115 and 116 are also held in a normally closed position. When contacts 102 and 103 are in a normally closed position and contacts 115 and 116 are also in a normally closed position, lead 130 has a negative potential while lead 131 has a positive potential which drives the motor 11 in a counter clockwise direction.

The action described above may also be described by the following reaction of each element in the ternary logic circuit 30.

Considering a positive potential on terminal 16, it will be seen that transistor 35 is forward biased while transistor 44 is back biased so that lead 51 has a high positive potential which is applied to diode 62 of OR gate 60 and also to diode 61*a* of OR gate 60*a*. At the same time, if a positive potential is applied to terminal 17, transistor 35*a* will be forward biased and transistor 44*a* will be back biased so that lead 51*a* has a positive potential which is applied to diode 61*a* of OR gate 60 and also to diode 61 of OR gate 60. Thus, OR gates 60 and 60*a* will be non-conducting in response to the high positive potential on leads 51 and 51*a*. When OR gates 60 and 60*a* are non-conducting, low limit threshold gate 70 is biased by voltage potential $V_1$ and is "off" because transistor 73*a* is forward biased while transistor 83*a* is back biased and non-conducting. Thus, contacts 102 and 103 are held in the normally closed position. Further, when OR gate 60 is non-conducting, low limit threshold gate 71 is also "off" because transistor 73 is forward biased while transistor 83 is back biased. Thus, solenoid 85 is not energized and the contacts 115 and 116 of relay 101 are held in a normally closed position. When the contacts of relays 100 and 101 are held in the normally closed position, lead 130 has a negative potential while lead 131 has a positive potential with respect to lead 130 and therefore, the motor 11 is energized in a counter clockwise direction. Thus, it may be seen, if both the differential amplifiers 31 and 32 are in the "positive" state or have a "positive" output, neither of the OR gates 60 or 60*a* will be conducting so that both relays 100 and 101 are off and the motor 11 is driven in a counter clockwise direction by an energizing current flowing through the normally closed contacts 102, 103, 115 and 116. It may be seen that an "AND" function is derived.

The motor 11 is de-energized, dynamically braked when relay 101 is energized. That is, when contacts 115 and 116 are opened in response to an energizing current in solenoid 85, ground is applied to both leads 130 and 131 and the motor 11 is dynamically braked. Relay 101 is energized when either one of the differential amplifiers has a "zero" output while the other differential amplifier has a "positive" output. OR gate 60 will conduct when either one of the differential amplifiers 31 or 32 has a "zero" output. Therefore an "OR" function is derived. When OR gate 60 conducts, transistor 73 is back biased and transistor 83 is forward biased and conducting. When transistor 83 is conducting, solenoid 85 is energized by current flowing from the source of positive potential to ground through the transistor 83.

The motor 11 may be driven in a clockwise direction when either one of the differential amplifiers 31 or 32 has a "negative" output on leads 51 or 52. Differential amplifiers 31 and 32 has a "negative" output when transistors 35 or 35*a* are back biased and transistors 47 or 47*a* are forward biased and provide a low resistance so that leads 51 or 51*a* has a low positive potential applied thereto. A low positive potential on leads 51 or 51*a* forward bias the diodes in the OR gates 60 and 60*a*. Therefore, an "OR" function is derived. When OR gates 60 and 60*a* are both conducting, low limit threshold gate 70 and high limit threshold gate 71 are "on," and solenoids 85 and 85*a* are energized causing the moveable contacts 106 and 110 of relay 100 to switch to contacts 104 and 108 respectively. When contacts 106 and 110 are switched, a positive potential is applied to lead 130 and a negative potential is applied to lead 131, causing the DC motor 11 to rotate in a clockwise direction. The low limit threshold gate 70 is "on" when OR gate 60*a* is conducting, since transistor 73*a* is back biased and transistor 83*a* is forward biased and presents a low impedance to ground.

In summary, it may be seen that the ternary logic circuit 30 provides a desired logic for controlling the motor 11 in response to certain signals from the impedance sensor 14 and the phase discriminator 15. The differential amplifiers effectively eliminate hunting, since they provide a "zero" zone along the linear curve 133. The desired logic effected by the ternary logic circuit may be simply stated as follows: if both of the differential amplifiers 31 and 32 have a "positive" voltage output, neither of the OR gates 60 and 60*a* will be conducting so that both relays 100 and 101 are de-energized and the motor 11 is driven in a counterclockwise direction by way of normally closed contacts 102, 103, 115 and 116. However, if either of the differential amplifiers 31 and 32 has a "negative" output on leads 51 and 51*a*, both of the OR gates 60 and 60*a* will conduct and both relays will be energized so that the contacts will be switched from a normally closed position to a normally open position providing a positive potential on lead 130 and a negative potential on lead 131, thus causing the motor 11 to be operated in a clockwise direction. If either of the differential amplifiers 31 and 32 has a "zero" output while the other has a "positive output," OR gate 60 will conduct and cause the low limit threshold gate 71 to be energized and open the normally closed contacts 115 and 116 so that leads 130 and 131 will both have a ground potential applied thereto causing the motor 11 to be de-energized and dynamically braked.

From the foregoing description it will be apparent that there has been provided an improved ternary logic circuit for an impedance matching system which eliminates such problems as hunting. Although only a single embodiment of the invention has been described, it will be appreciated that variations and modifications of circuit elements and components will become apparent to those skilled in the art. Accordingly, the foregoing description should be taken merely as illustrative and not in any limiting sense.

What is claimed is:

1. Logic circuitry comprising (a) first and second differential amplifiers which operate in a linear mode for first and second input signals falling within a given voltage range, (b) first and second threshold gating means each connected to both said first and second differential amplifiers for providing a first output when said first and second input signal voltages are at one given high voltage level above said range and for providing a second output when either of said first and second input signal voltages are at another given low voltage level below said range, said outputs being binarily related to each other, and (c) first and second relays respectively including first and seconds solenoids connected to said first and second gating means outputs to be energized and de-energized respectively for different ones of said binarily related outputs.

2. The invention defined in claim 1 further including reversible motors means including a motor having a shaft and a source of power to rotate said shaft in one direction when said first and said second solenoids are energized and to rotate said shaft in the opposite direction when said first and said second solenoids are de-energized and to dynamically brake said motor when said one solenoid is energized.

3. The invention defined in claim 2 further including an impedance matching means including an impedance sensor for providing said first input signal voltage and a phase discriminator for providing said second input signal voltage and also including a tunable reactive element coupled to said shaft for adjusting the reactance of said element in response to said input signal voltages whereby to match the impedance of a load connected to said reactive element.

4. The invention defined in claim 1 further including reversible motor means including a motor having a shaft and a source of power, said first and second relays each having a pair of contacts which are switched when their respective solenoids are energized, means for connecting said power source to said motor through said pairs of contacts of both of said relays such that one polarity of power is connected to said motors when both of said solenoids are de-energized and the opposite polarity of power is connected to said motor through the contacts associated with said first relay when only said first solenoid is energized and power is disconnected from said motor when only said second solenoid is energized.

5. The invention as set forth in claim 1 wherein said first and second threshold gating means each is connected to the output of both said first and second differential amplifiers through a pair of separate diodes, each of said diodes being polarized in the same direction.

6. In an antenna tuning system having an adjustable reactance element adapted to be connected to the antenna, means for changing the reactance of said element in opposite senses, means for sensing the impedance of said system looking into said element from the antenna, means for sensing the phase relationship of the current passing through and the voltage across said element, and each of said impedance sensing means and phase discriminating means providing separate error signals, the improvement which comprises ternary logic means responsive to both of said error signals for providing output error signals for controlling said reactance element, said ternary logic means including means responsive to error signals from said sensing and discriminating means which are both above a high threshold for providing a first of said output error signals to said changing means for adjusting said reactance element in a first sense, means responsive to either of said error signals from said sensing and discriminating means being below a low threshold for providing a second of said output error signals to said changing means to cause said changing means to adjust said reactance element in a second sense opposite to said first sense, and means responsive to both of said error signals from said sensing and discriminating means being of a value between said low and high thresholds or at least one of said error signals from said sensing and discriminating means being of a value between said low and said high thresholds while the other thereof is above said high threshold for providing a third output error signal which inhibits the adjustment of said reactance element.

7. The invention as set forth in claim 6 wherein said ternary logic means includes differential amplifiers respectively responsive to the error signals from said impedance sensing means and said phase discriminating means, said differential amplifying means having linear amplitude response characteristics for amplitudes of said sensing and discriminator means output signals between said high and low thresholds.

8. The invention as set forth in claim 7 wherein said means responsive to said sensing and discriminating means error signals includes a pair of threshold gates, each providing an output when an input thereto exceeds a different threshold voltage, and a pair of diode gates each output connected to a different one of said threshold gates and each input connected to both of said differential amplifiers.

References Cited

UNITED STATES PATENTS

| | | | |
|---|---|---|---|
| 2,505,511 | 4/1950 | Vogel | 333—17 |
| 2,742,618 | 4/1956 | Weber | 333—32 XR |
| 2,745,067 | 5/1956 | True et al. | 333—17 |
| 2,838,658 | 6/1958 | Vogel et al. | 333—17 |
| 3,160,833 | 12/1964 | Ludvigson et al. | 325—174 XR |

FOREIGN PATENTS

| | | |
|---|---|---|
| 478,279 | 6/1959 | Canada. |

OTHER REFERENCES

"Problems in Automatic Tuner Design," Hay CQ, January 1954, pp. 33–38.

ELI LIBERMAN, Primary Examiner

M. NUSSBAUM, Assistant Examiner

U.S. Cl. X.R.

307—218, 235, 290